(No Model.)
W. J. WICKHAM.
Saw Mill Dog.
No. 234,099.  Patented Nov. 2, 1880.
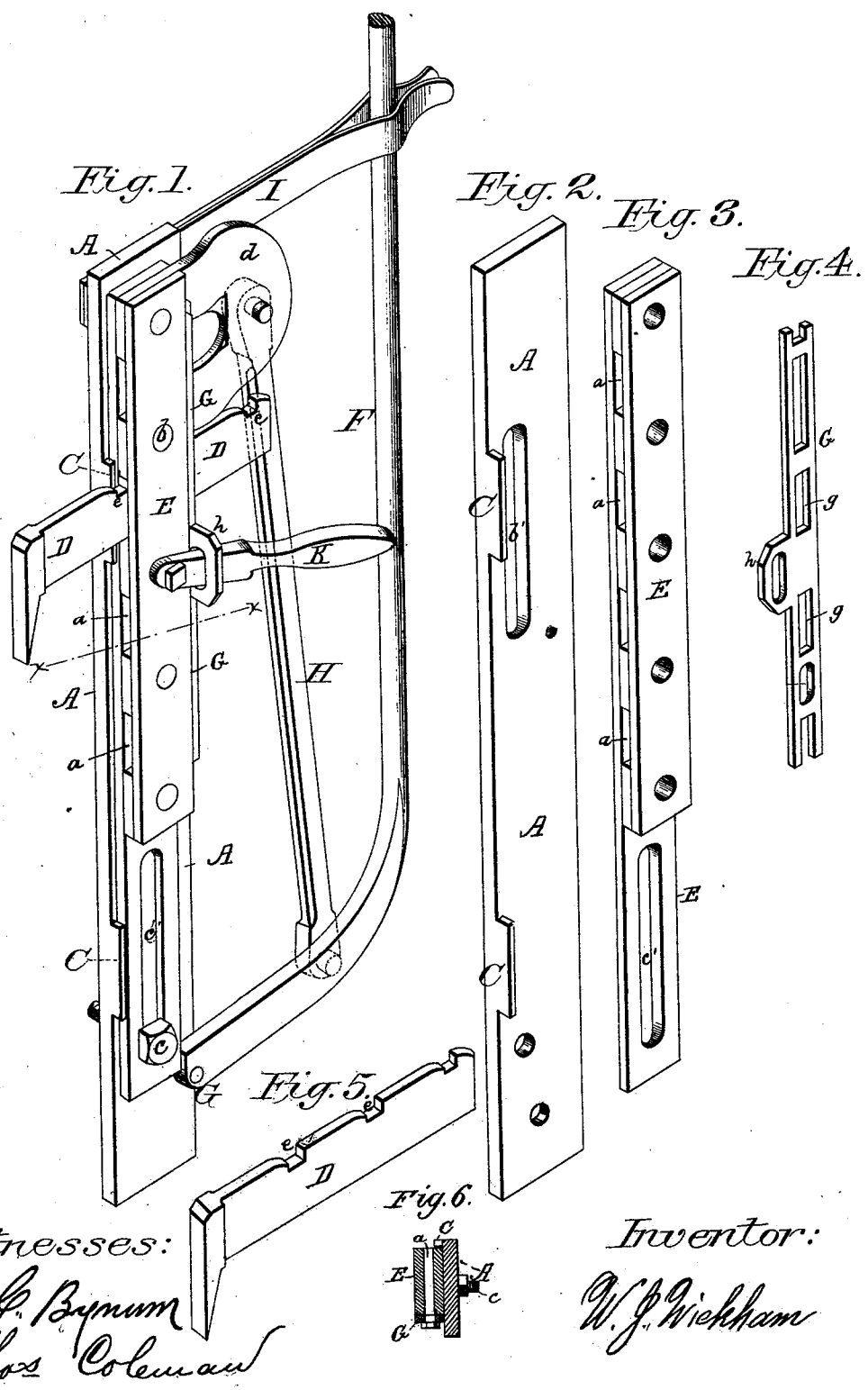
Witnesses:
D. C. Bynum
Thos. Coleman
Inventor:
W. J. Wickham

United States Patent Office.

WILLIAM J. WICKHAM, OF FOREST HOME, TEXAS.

SAW-MILL DOG.

SPECIFICATION forming part of Letters Patent No. 234,099, dated November 2, 1880.

Application filed July 26, 1880. (No model.)

*To all whom it may concern:*

Be it known that I, WILLIAM J. WICKHAM, of Forest Home, in the county of Cass and State of Texas, have invented a new and Improved Saw-Mill Dog; and I do hereby declare that the following is a full, clear, and exact description of the same.

My invention is an improvement in the class of dogging apparatus which is affixed to one of the knees of a head-block of the log-carriage.

The improvement relates to the construction and combination of parts hereinafter described and claimed.

In the accompanying drawings, Figure 1 is a perspective view of the dogging apparatus. Figs. 2, 3, 4, 5 are, respectively, perspective views of the stand, dog-bar, drop-catch, and dog detached from each other. Fig. 6 is a cross-section on line $xx$, Fig. 1.

The base-stand A (shown detached in Fig. 2) is, in practice, secured by suitable bolts to one of the knees of the head-block. (Not shown.) The stand, with its attached spring-catch or lever-holder I, is the only part of the apparatus which is fixed in position, all the others (which are attached to it) being movable or adjustable. The dog D is held in one of the slots, $a$, of the bar E, which slides vertically on the base-stand A, being secured thereto by bolts $b\ c$. One of said bolts—to wit, $b$—is fixed in the bar E, and passes through a lengthwise slot, $b'$, in the stand A, while the other bolt, $c$, is fixed in the stand A and passes through the lengthwise slot $c'$ in the bar E. Thus the latter has a free but limited range of vertical movement, which is imparted to it by means of a curved hand-lever, F. The latter is pivoted to the lower portion of stand A, and connected by rod H with a curved rearwardly-projecting arm, $d$, of the dog-bar.

When the apparatus is not in use the lever is held in vertical position by means of the spring-catch I.

The shank of the dog D has notches $e$ in its upper edge to adapt it for locking with a drop-catch, G, (shown detached in Fig. 4,) which is applied to the rear side of the dog-bar, as shown in Figs. 1 6, and secured by bolts that pass through slots therein, whereby it is free to move vertically. The catch G is a straight bar having slots $g$ to receive the dog D, and a slotted ear, $h$, to receive the small hand-lever K, by which it is raised out of engagement with the dog whenever it is required to adjust the latter lengthwise for the purpose of dogging logs of different sizes—in other words, the drop-catch G holds the dog D fixed in any adjustment, but may be raised by lever K so as to release the dog and permit its adjustment. The dog may be placed higher or lower—that is to say, in any of the slots $a$ of the sliding dog-bar E—according to the diameter of the logs to be sawed. In such case the drop-catch G may be correspondingly adjusted.

The front end of the stand A is provided with lateral flanges C, with which the dog-bar E slides in contact. Their function is to relieve the bolts $b\ c$ of strain and excessive friction, and, thereby, of the rapid wear to which they would otherwise be subjected in the operation of dogging.

I do not claim the main lever and its spring-holder in combination with a stand and sliding dog-bar; but What I do claim is—

1. The combination of the notched dog and adjustable slotted drop-catch with the slotted movable dog-bar and base-stand, substantially as shown and described, for the purpose specified.

2. The combination of the slotted base-stand A, provided with lateral flanges C on its front edges, the slotted dog-bar E, working in frictional contact with said base-stand, the bolts $b\ c$, for securing the parts together, the dog D, and means for operating the dog-bar, all substantially as shown and described.

3. The combination, with the base-stand A and sliding dog-bar E, of the drop-catch G, provided with a lateral slotted ear, $h$, and the hand-lever K, pivoted to the dog-bar, as shown and described.

WILLIAM J. WICKHAM.

Witnesses:
THOMAS COLEMAN,
F. C. DICKASON.